United States Patent [19]
Ettlinger, Jr. et al.

[11] 3,977,549
[45] Aug. 31, 1976

[54] CONSTRUCTION FOR CLEARING TABLEWARE FROM TRAYS

[75] Inventors: Ralph Ettlinger, Jr., Glencoe; Frank J. Kostohryz, Elmhurst, both of Ill.

[73] Assignee: Avant Industries, Inc., Wheeling, Ill.

[22] Filed: Feb. 10, 1975

[21] Appl. No.: 548,726

[52] U.S. Cl. .............................. 214/318; 214/1 Q
[51] Int. Cl.² ........................................ B65G 65/04
[58] Field of Search ........... 198/248, 258, 235, 265; 214/315, 311, 316, 318, 317, 308, 64, 1 QG, 1 Q, 1 QB, 1 QD

[56] References Cited
UNITED STATES PATENTS

| | | | |
|---|---|---|---|
| 2,534,221 | 12/1950 | Borkmann | 198/248 |
| 2,827,677 | 3/1958 | Granath | 214/318 |
| 3,107,800 | 10/1963 | Gerrans | 214/311 |
| 3,189,192 | 6/1965 | Egger | 214/1 QG |
| 3,223,097 | 12/1965 | Spaulding | 214/308 |
| 3,487,953 | 1/1970 | Wolf | 214/1 QG |

Primary Examiner—Albert J. Makay
Assistant Examiner—Lawrence J. Oresky
Attorney, Agent, or Firm—McDougall, Hersh & Scott

[57] ABSTRACT

A construction for handling soiled tableware whereby the tableware is loaded on a cafeteria tray or the like and wherein the tray is moved to a station for discharging the tableware from the tray. A paddle or the like provides a lifting means which operates to pivot the tray to achieve a partial tilt thereof. A swinging arm serves as a second lifting means which engages the partially tilted tray and completes pivoting movement so that the contents of the tray will be completely removed by gravity. The driving action for both the paddle and swinging arm comprises a single rotating shaft supporting the paddle and carrying an eccentric which transmits swinging movement to the arm.

8 Claims, 6 Drawing Figures

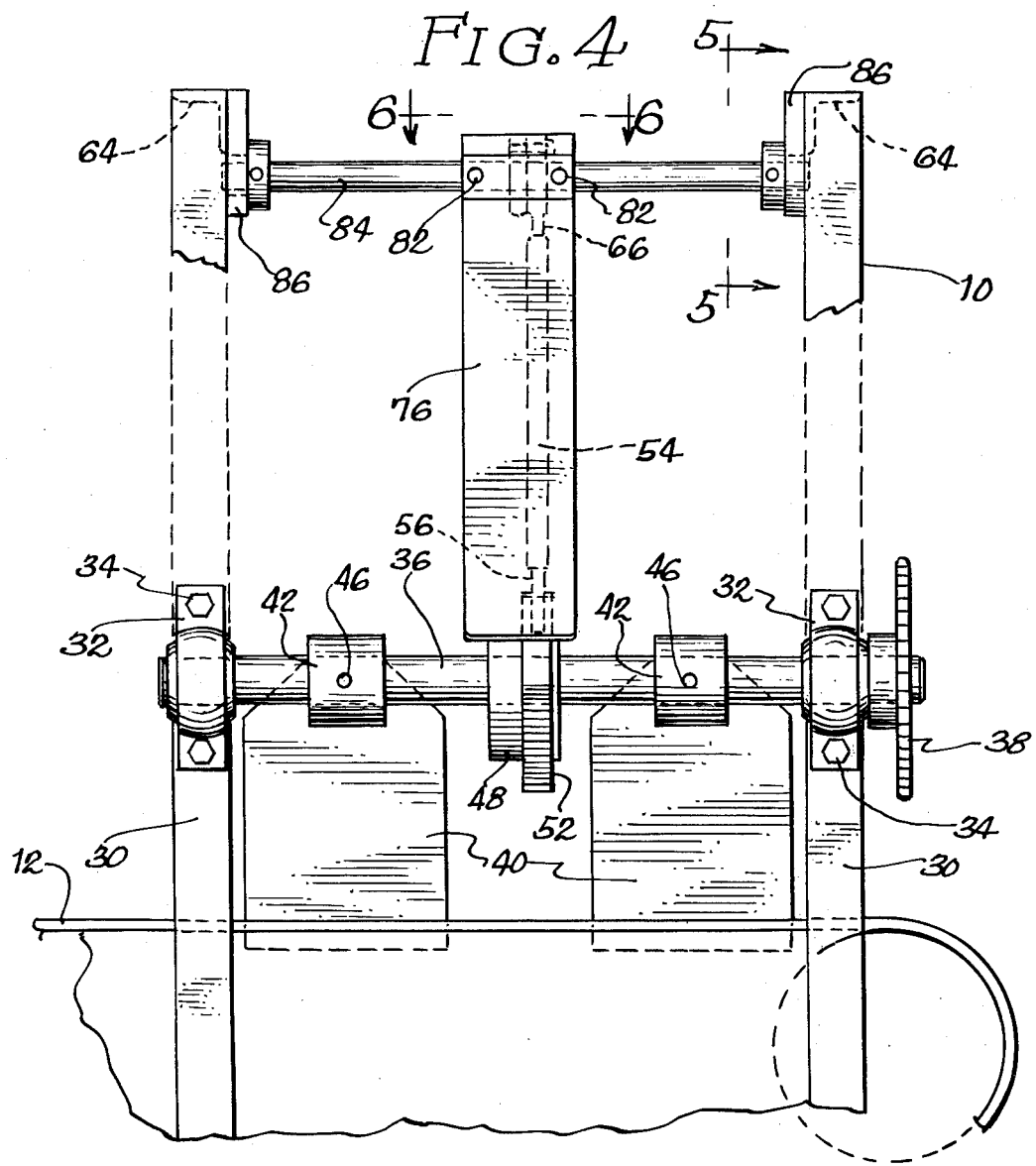
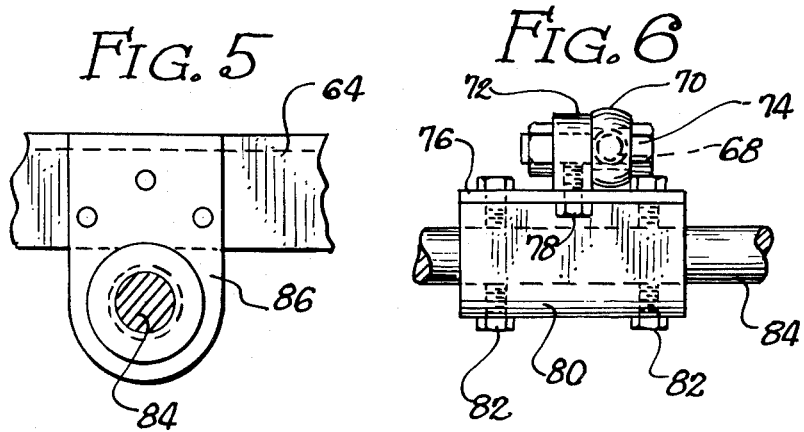

CONSTRUCTION FOR CLEARING TABLEWARE FROM TRAYS

This invention relates to a construction for achieving the discharge of soiled tableware from cafeteria trays and similar carrying means for the tableware. In particular, the apparatus is concerned with means adapted to automatically discharge the soiled tableware in the course of a dishwashing operation whereby the handling of the tableware can be carried out on an efficient basis.

It is well known that many institutions, for example, schools and restaurants, handle large volumes of tableware in providing food service. A typical arrangement involves cafeteria style service wherein persons place tableware including plates, saucers, cups, glasses and silverware on a cafeteria tray. When the meal is finished, these must be collected in some fashion and prepared for washing.

It is normal practice to separate and then stack or otherwise collect the various types of tableware. For example, employees will form separate stacks of cafeteria trays, plates, saucers, cups, etc., and the same or other personnel will load the stacked pieces onto racks used in automatic dishwashing equipment or directly onto conveyors provided in the equipment. This, of course, involves a separate unstacking operation for articles such as plates, bowls, dishes and saucers.

U.S. Pat. No. 3,605,767, entitled "Vibrating Sorter For Soiled Tableware" describes a system for the handling of tableware whereby the tableware can be conveyed in random fashion to separating equipment for automatically locating the tableware in a dishwashing machine with different items such as cups and glasses being separated from other items such as plates and silverware. An important phase of the separating operation involves the discharge of the soiled tableware from cafeteria trays or other trays or carrying means which might be used for transporting the tableware to the vicinity of the dishwashing equipment. In addition, it is desirable to provide separate cleaning means whereby the trays can be efficiently cleaned subsequent to discharge of the tableware.

In Ettlinger, et al. U.S. Pat. No. 3,584,752, issued on June 15, 1971, and entitled "Tableware Tray Tilting and Conveying Means", there is described a structure for achieving the automatic discharge of soiled tableware from cafeteria trays and the like. This invention is directed to an improved mechanism for achieving the objects set forth in that patent.

It is a particular object of the instant invention to provide a tableware discharge mechanism which is relatively uncomplicated and inexpensive whereby manufacturing and maintenance costs for the construction can be kept to a minimum.

It is an additional object of this invention to provide a tableware discharge construction which is characterized by the unique combination of lifting means for cafeteria trays and the like whereby the discharge of the tableware can be accomplished in rapid fashion and without any significant problem from the standpoint of damage to the tableware.

These and other objects of this invention will appear hereinafter and for purposes of illustration, but not of limitation, specific embodiments of the invention are shown in the accompanying drawings in which:

FIG. 4 is a front elevational view of the construction;

FIG. 5 is an enlarged fragmentary view taken about the line 5—5 of FIG. 4; and,

FIG. 6 is an enlarged fragmentary view taken about the line 6—6 of FIG. 4.

The construction of this invention comprises a mechanism for handling soiled tableware wherein the tableware is loaded on a carrying means and moved to a station for discharge of the tableware from the carrying means. The improvements of the invention specifically involve means for tilting the carrying means at the discharge station. These tilting means comprise first and second lifting means which cooperate to achieve the discharge operation.

The first lifting means preferably comprise one or more paddles which engage a side edge of the carrying means. Drive means for the paddles operate to move the paddles in a path such that the carrying means pivot into a partially tilted position. At this point, a second lifting means, preferably in the form of a swinging arm engages a side edge of the carrying means and completes pivoting movement to the extent that complete discharge of the soiled tableware is achieved. As indicated, the carrying means will usually comprise a standard cafeteria tray; however, the concepts of the invention are adaptable to achieve discharge from other carrying means.

The particular embodiment of the invention shown in the accompanying drawings comprises a frame 10 which is positioned to straddle the conveyor belt 12. This belt is movable on a supporting bed 14, and any suitable arrangement, for example as described in the aforementioned U.S. Pat. No. 3,584,752, may be utilized for driving this belt.

Figure 1:
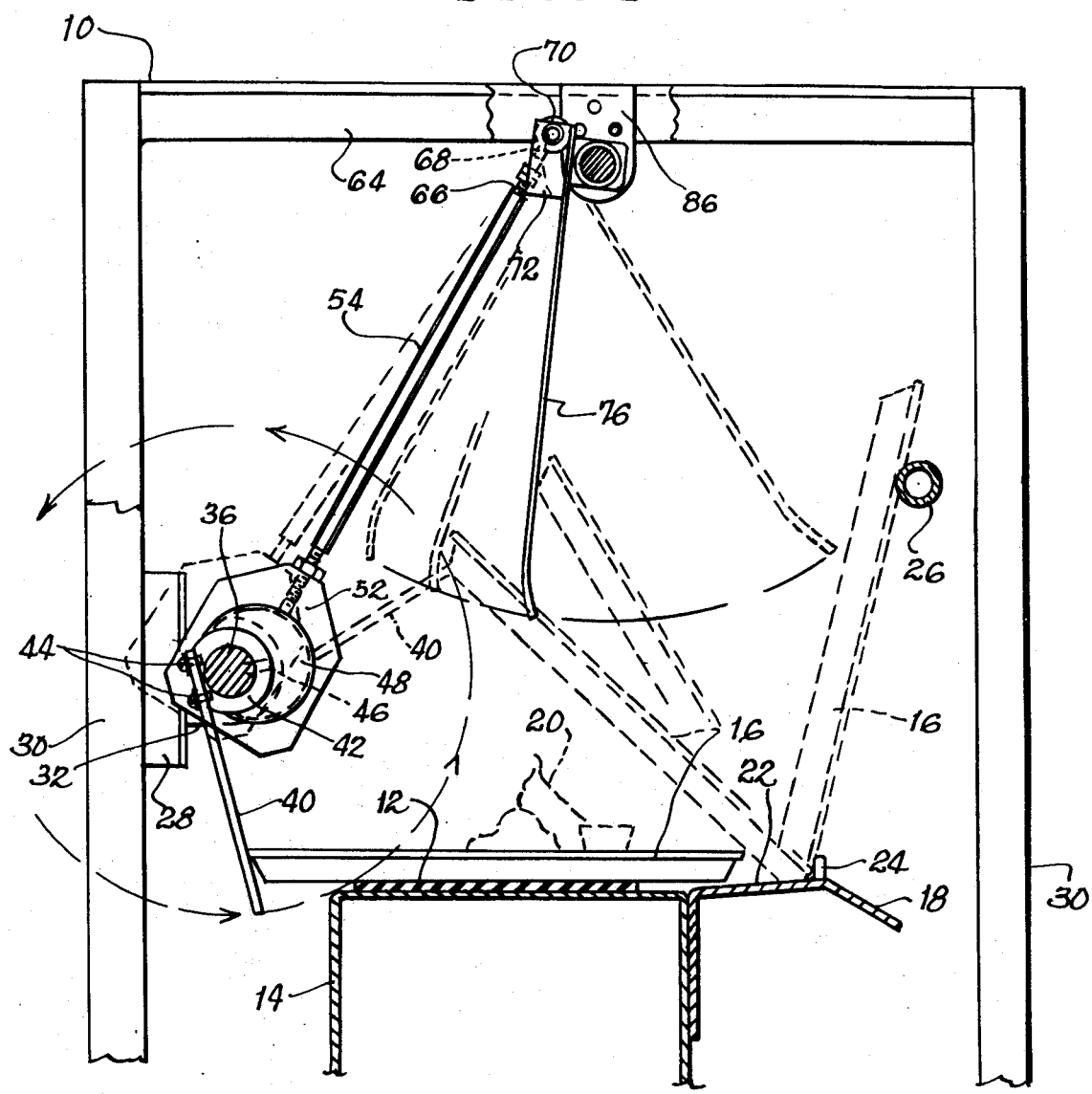
FIG. 1 is a side elevational view, partly in section of the tilting structure of the invention.

Successive cafeteria trays 16 are movable by means of the belt 12 to the station occupied by the frame 10 and associated mechanisms. A discharge chute, the upper end of which is shown at 18, is provided for receiving soiled tableware 20 located on the trays 16. A continuation of the chute 18 provides a ledge 22 which supports one or more pegs 24. As illustrated in FIG. 1, the trays 16 are adapted to pivot around these pegs. A rail 26 is located above the chute 18 to limit the extent of pivoting movement. Any suitable driving means, for example as described in the aforementioned U.S. Pat. No. 3,584,752, may be utilized for moving trays from the discharge position so that successive trays can be brought into this position.

The tilting mechanisms of the invention are supported by the frame 10. Specifically, a pair of blocks 28 are attached to vertical frame members 30, and bearing supports 32 are attached to these blocks by means of bolts 34. A drive shaft 36 is received in the bearing supports, and a sprocket 38 is attached at one end of the shaft for achieving rotation of the shaft.

A pair of paddles 40 are attached to collars 42 by means of bolts 44. The collars are tied to the shaft 36 by means of set screws 46 whereby the paddles 40 move in a circular path around the shaft as the shaft rotates.

Figure 2:
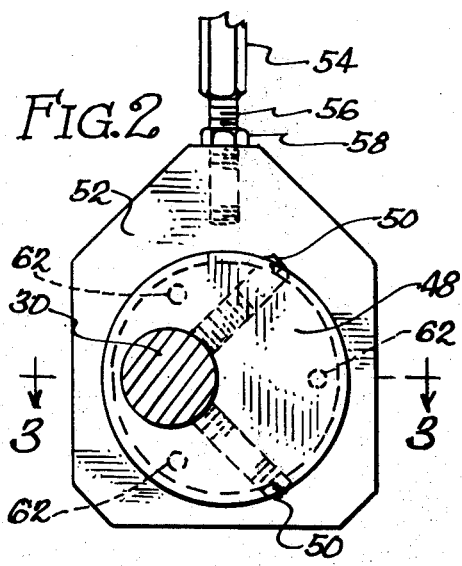
FIG. 2 is an enlarged detail view particularly illustrating the eccentric drive means utilized in the construction.
Figure 3:
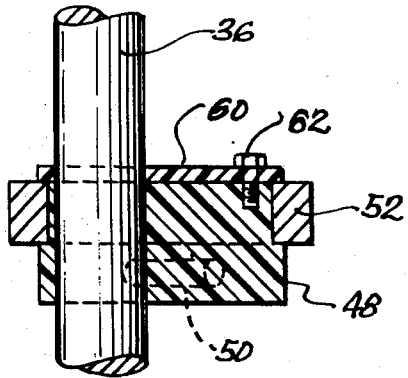
FIG. 3 is a horizontal cross-sectional view taken about the line 3—3 of FIG. 2.

The shaft also supports an eccentric 48 which is secured to the shaft by means of set screws 50. This eccentric is preferably formed from nylon or other long wearing material. The eccentric carries a support 52, and this support in turn receives drive rod 54. As best shown in FIG. 2, the drive rod defines a threaded end 56, and a threaded bore is provided in the support 52 so that the rod can be attached to the support and then secured in place by means of nut 58. A nylon plate 60 is secured in place by means of bolts 62 for purposes of holding the support 52 in place after the support is fit around the eccentric.

The rod 54 extends upwardly toward horizontal frame members 64, and the threaded end 66 of the rod is received within the threaded bore defined by the shank 68 of eyelet member 70. This member, as best shown in FIG. 6, is attached to a block 72 by means of bolt 74. The block 72 is secured to arm 76 by means of bolts 78, and the arm 76 is in turn attached to a block 80 by means of bolts 82. The block 80 defines a bore which receives shaft 84, and this shaft is received in journals 86 supported at each end of the frame members 64.

The apparatus of the invention operates to automatically discharge the contents of each tray 16 which is moved by a conveyor 12 to the discharge location. Specifically, the shaft 36 rotates continuously whereby at least one of the paddles 40 will engage each tray moved to the discharge position. The paddles will initially serve to slide the trays into engagement with pegs 24, and then commence tilting of the trays. In the embodiment shown, the tilting amounts to about 45°; however, the invention contemplates tilting between 30° and 60°.

The movement of swinging arm 76 is synchronized with the paddle movement so that the arm will engage a side edge of a tray at approximately the limit of tilting movement achieved with the paddles. As illustrated in FIG. 1, the arc of the swinging arm is such that continued pivoting occurs with the tray ultimately reaching a tilt of about 100° so that the tray leans against rail 26 and is held without other support. This final tilting may range from 80° to 110° so that all material on a tray will be discharged.

The discharging sequence is such that the next tray 16 will be engaged by the paddles while the arm 76 is completing its movement whereby a rapid sequence is achieved. As described in the aforementioned U.S. Pat. No. 3,584,752, the sequence of operations may be controlled with the use of appropriate tray feed means and associated circuitry.

The particular design of the lifting mechanisms enables discharge of tray contents in a highly efficient manner particularly from the standpoint of achieving the discharge without damaging the tableware. Thus, in large restaurant and similar operations where speed of operation is significant, it is important to provide discharge mechanisms which will operate rapidly but which are not prone to breaking glasses and other tableware. By providing the dual lifting members referred to, a sufficiently fast operation is possible without unnecessarily jolting or otherwise mishandling the trays and their contents. It has been found that the initial tilting with the paddles to a relatively low angle provides relatively gradual sliding movement for the articles on the tray, and the arm movement then completes the discharge operation at a relatively low rate in view of the limited degree of movement imparted by the eccentric. While this movement is occurring, the paddles are being repositioned for engaging the next tray so that the speed of the operation is not impaired.

The particular design also provides substantial efficiencies in that both the paddle and arm movement can be accomplished through the operation of a single drive shaft. The limitation on the number of drive elements involved, as well as the relatively simple structure of the particular elements also reduces construction and operating costs.

It will be understood that various changes and modifications may be made in the construction described which provide the characteristics of the invention without departing from the spirit thereof particularly as defined in the following claims.

That which is claimed is:

1. In a construction for handling soiled tableware wherein the tableware is loaded on carrying means and moved to a station for discharge of the tableware from the carrying means, the improvement in means for discharging the tableware from the carrying means, said discharge means comprising first lifting means engageable with said carrying means, means for driving said first lifting means to tilt said carrying means, said first lifting means comprising at least one paddle, said paddle being driven into engagement with a side edge of said carrying means, and including means for restraining the opposite edge of said carrying means whereby the carrying means pivots and is tilted about said opposite edge in response to the movement of said first lifting means by said driving means, and second lifting means engageable with said carrying means while the carrying means is in the tilted position, said second lifting means operating to further pivot and tilt the carrying means to insure complete discharge of the contents thereof.

2. A construction in accordance with claim 1 wherein said second lifting means comprises an arm engageable with the side edge of the carrying means engaged by said paddle, said carrying means continuing to pivot about said opposite edge in response to the movement of said arm.

3. A construction in accordance with claim 2 wherein said first lifting means pivots the carrying means from a horizontal position through an angle of 30° to 60° and wherein said second lifting means pivots the carrying means to an angle of 80° to 110° relative to the horizontal.

4. In a construction for handling soiled tableware wherein the tableware is loaded on carrying means and moved to a station for discharge of the tableware from the carrying means, the improvement in means for discharging the tableware from the carrying means, said discharge means comprising first lifting means engageable with said carrying means, means for driving said first lifting means to tilt said carrying means, said first lifting means comprising at least one paddle, said means for driving said first lifting means comprising a continuously rotating shaft with said paddle extending outwardly of said shaft and being secured to the shaft for rotation therewith, and conveyor means for moving successive carrying means into the path of movement of said paddle for engagement of the carrying means by the paddle, and second lifting means engageable with said carrying means while the carrying means is in the tilted position, said second lifting means operating to further tilt the carrying means to insure complete discharge of the contents thereof.

5. A construction in accordance with claim 4 wherein said second lifting means comprises a downwardly extending arm, means mounting said arm for reciprocal swinging movement from a position for engaging a side edge of the carrying means to a position completing the pivoting movement of the carrying means, and including a rod extending between said shaft and the mounting means for said arm for imparting the reciprocal movement to the arm.

6. A construction in accordance with claim 5 including an eccentric mounted on said shaft, said rod being connected to said eccentric.

7. A construction in accordance with claim 6 wherein said first lifting means comprise a pair of paddles, one paddle being mounted on said shaft on opposite sides of said eccentric, said arm being movable in a path between the path of movement of said paddles.

8. A construction in accordance with claim 5 wherein said shaft is located below said mounting means for said arm, said rod extending upwardly from said shaft to said mounting means.

* * * * *